United States Patent [19]
Stalley et al.

[11] 3,990,103
[45] Nov. 2, 1976

[54] INPUT OSCILLATORS FOR TIME BASE CORRECTORS

[75] Inventors: Anthony Donald Stalley, Fleet; John Albert Coffey, Newbury, both of England

[73] Assignee: Quantel Limited, England

[22] Filed: June 6, 1975

[21] Appl. No.: 584,544

[30] Foreign Application Priority Data
June 13, 1974 United Kingdom............... 26214/74

[52] U.S. Cl............................... 358/8; 178/69.5 CB
[51] Int. Cl.²......................................... H04N 5/76
[58] Field of Search.......................... 358/8, 19, 20; 178/69.5 CB; 360/36

[56] References Cited
UNITED STATES PATENTS
3,030,438  4/1962  Newell..................................... 358/8
3,100,816  8/1963  Coleman et al.......................... 358/8

OTHER PUBLICATIONS
Coleman, "A New Technique for Time–Base Stabilization of Video Recorders," IEEE Transactions on Broadcasting, vol. BC–17, No. 1, Mar. 1971, pp. 28–36.

Primary Examiner—John C. Martin
Attorney, Agent, or Firm—Dowell & Dowell

[57] ABSTRACT

An input oscillator for use in a digital time base corrector comprising a triggered oscillator circuit and a variable period delay device having a first input for receiving the synchronizing pulse and for producing an output pulse whose back edge coincides approximately in time with the center of the filtered colour burst. A select burst transition device has an input connected to the delay device and an output for triggering the oscillator circuit. A window circuit has an output connected to a second input of the delay device. A pulse former is provided controlled from the trailing edge of the output of the delay device. The bistable window circuit effects change of the delay period of the delay device when the output of the pulse former coincides in the window circuit with a burst transition whereby the trailing edge of the output of the delay device is made to occur between burst transitions.

4 Claims, 1 Drawing Figure

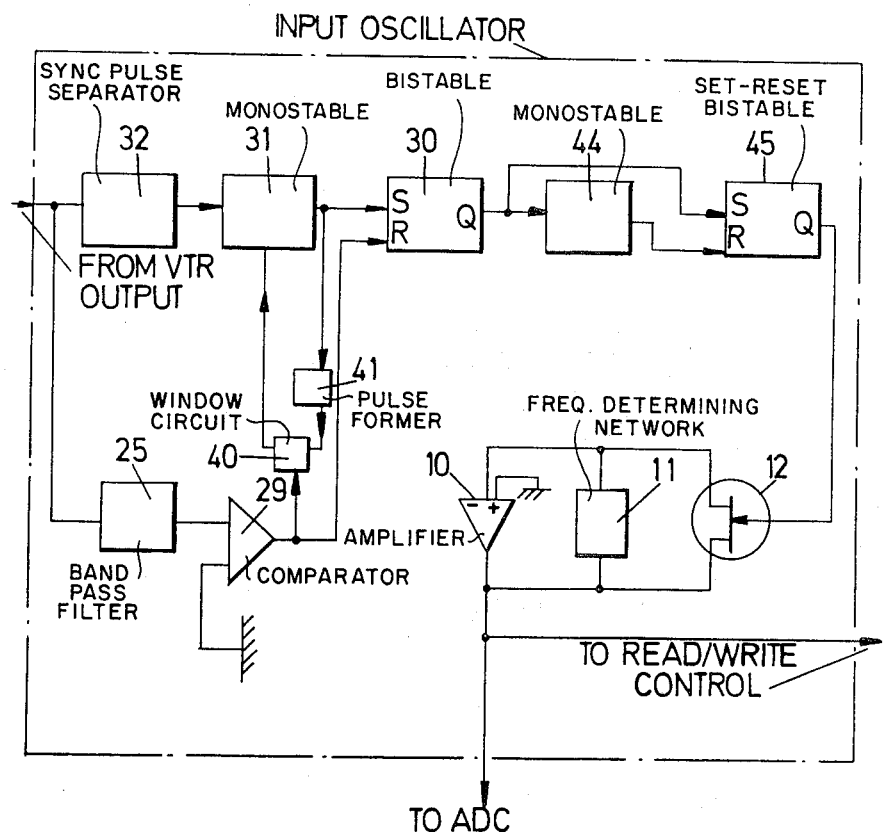

INPUT OSCILLATORS FOR TIME BASE CORRECTORS

BACKGROUND TO THE INVENTION

This invention relates to input oscillators used to track the synchronizing information contained in the output signal of a video tape recorder (VTR). The clock pulses produced by the oscillator are then used to sample the output signal from the video tape recorder, and write it into the storage in the time base corrector. The invention is an improvement on the input oscillator circuit described in our co-pending U.S. Pat. Nos. 558,091 and 558,090, under the title Improvements to Digital Time Base Correctors for Television Equipment.

A first improvement relates to that part of the circuit used for combining the synchronizing information derived from the incoming horizontal synchronizing pulse and from the zero crossings of the colour sub carrier burst. It is required to produce a starting pulse for the triggered oscillator from these two pieces of synchronizing information. The horizontal synchronizing pulse is used as a coarse timing reference while the colour sub carrier burst is used for fine timing. In a simple system disclosed in our copending applications referred to above, a monostable is triggered by the leading edge of the incoming horizontal synchronizing pulse. This monostable produces an output pulse whose back edge coincides approximately in time with the centre of the colour burst after the burst has passed through a band pass filter of 0.5 MHz band width. The next zero crossing of the filtered sub carrier burst occurring after the trailing edge of the pulse produced by the monostable is then used as the timing reference to start the triggered oscillator.

One of the problems with this simple system occurs because there is no defined phase relationship between the sub carrier burst phase and the horizontal synchronizing pulse. Therefore at certain timing relationships between the burst zero crossings and the horizontal synchronizing pulse leading edge, there is an ambiguity regarding which sub carrier zero crossing occurs after the monostable pulse has ended. Because in a practical system there will be noise present on the synchronizing information, the oscillator start pulse produced may jitter in time by one sub carrier period.

SUMMARY OF THE INVENTION

According to the invention there is provided in an input oscillator for use in a digital time base corrector comprising a triggered oscillator circuit, a variable period delay device having a first input for receiving the synchronizing pulse and for producing an output pulse whose back edge coincides approximately in time with the centre of the filtered colour burst, and a select burst transition device having an input connected to said delay device and an output for triggering said oscillator circuit, the provision of a window circuit having an output connected to a second input of said delay device for changing the delay period thereof, and a pulse former controlled from the trailing edge of the output of said delay device, wherein said bistable window effects change of the delay period of said delay device when the output of said pulse former coincides in said window circuit with a burst transition whereby the trailing edge of the output of the delay device is made to occur between burst transitions.

BRIEF DESCRIPTION OF THE DRAWING

The invention will now be described by way of example with reference to the accompanying drawing which is a block diagram of an input oscillator incorporating the improvements according to the present invention.

DESCRIPTION OF PREFERRED EMBODIMENT

The input oscillator shown in the FIGURE is an improved version of that described in U.S. Pat. Nos. 558,091 and 558,090 referred to above. The first piece of synchronizing information is obtained from the video signal from the VTR output by separating the horizontal rate sync pulses by means of a sync pulse separator 32 and using this to change the state of a monostable 31 (e.g. Texas Instruments 74121) which gives a delayed output in relation to the sync pulse. This delayed output serves as the coarse timing reference.

The second piece of synchronizing information is also derived from the VTR signal. This is the colour burst which is filtered by a band pass filter 25. A comparator circuit 29 (e.g. Signetics NE 521) compares the filtered sub carrier burst with a known reference signal such as zero volts and produces at its output a square wave corresponding to the burst information occurring at each zero crossing of the modified burst signal. The output of the comparator 29 (zero crossing detector) is coupled with one input R of a bistable 30 (e.g. Texas Instruments 7474). This serves as the fine timing reference.

The improvement in this circuit is provided by the inclusion of a window circuit 40 having one input connected to the output of the comparator 29 and a pulse former 41 connected between the output of the monostable 31 and a second input of the window circuit 40. This allows the period of monostable 31 to be changed.

In operation, the horizontal sync pulses are fed to monostable 31 which gives an 8 microsecond delay. This is triggered by the leading edge of the horizontal synchronizing pulse from the sync pulse separator 32, and the output is fed to the bistable 30 and the pulse former 41. The pulse former 41 forms a 30nS pulse from the trailing edge of the monostable 31 output. This narrow pulse is fed to the window circuit 40 which is opened by the pulse. If a negative going burst transition is present at the time this window circuit is opened, a signal is generated at the output of the window circuit 40 which changes the monostable period of monostable 31 by 150nS (i.e. ½ sub carrier period). The monostable period now becomes 8.15 microseconds and the monostable period will remain at 8.15 microseconds until a further burst transition is detected that occurs coincident with any subsequent period in which the window circuit is open. Any further coincidence will cause the monostable to revert to the 8 microsecond period. The reason for this is that if the burst transition is detected by the window circuit 40, then it may be considered that the trailing edge of the output of monostable 31 is too near to a burst transition. As the sub carrier period is approximately 300nS, changing the period of monostable 31 by 150nS places the monostable trailing edge halfway between two active burst transitions. By this means, the active edge of the 8 microsecond monostable output is always made to occur at a time such that there is no ambiguity concerning which burst transition is being selected.

A second improvement to the input oscillator concerns its operation when for some reason one or more of the horizontal frequency start pulses are missing. One or more of these pulses may be absent from time to time due to the oxide dropouts occurring on the video tape. These cause the output signal of the video tape recorder to disappear. The period of these dropouts may vary from a few microseconds to many lines.

If one of these dropouts occurs during the line synchronizing pulse period, a synchronizing pulse will not be produced at the output of the synchronizing separator in the time base corrector in order to trigger the 8 microsecond monostable circuit previously referred to. If this monostable is not fired, the input oscillator start pulse will not be produced, and clock pulses will be absent for the rest of that line. In this way, short dropouts occurring during the synchronizing period can cause whole line of picture information to be missing. To prevent this happening an improvement has been made to the oscillator to ensure that it continues running at its natural frequency if a horizontal synchronizing pulse is missing.

The oscillator comprises an inverting amplifier 10, a frequency determining network 11 and a switch 12, which is stopped after a set number of cycles (approximately 576). In the present invention, it is arranged that the oscillator is not stopped until a new selected burst transition is received. In this way, if no transition is received, the oscillator will continue for the whole of the next line.

This is achieved by connecting the output from the bistable 30 (i.e. the selected burst transition) to a 750nS monostable 44 (e.g. Texas Instruments 74121) and to the set input of a Set/Reset bistable circuit 45 (e.g. Texas Instruments 7474). This transition sets the bistable 45 to a high output which stops the triggered oscillator. After a period of 750nS the output pulse of the monostable 44 resets the bistable 45 to a low condition which starts the triggered oscillator. If the next selected burst transition does not appear, the bistable 45 will remain in the Reset condition keeping the oscillator running.

We claim:

1. An input oscillator for use in a digital time base corrector controlled by an incoming video signal containing horizontal synchronising pulses and colour burst information, comprising:

a. a variable period delay device having a first input for receiving the horizontal synchronising pulse information, a control input for receiving a control signal to effect variation of said delay period, and an output for producing a pulse having a trailing edge approximately coincident in time with the centre of the filtered colour burst;
   b. a select burst transition device having a first input connected to said delay device output, a second input connected to receive said filtered colour burst and to detect burst transitions thereon, and an output for producing a trigger signal after the receipt of a selected burst transition;
   c. a triggered oscillator circuit controlled by means of the output from said transition device;
   d. a pulse former connected to said delay device output for producing a narrow pulse at an output on receipt of the trailing edge therefrom;
   e. a window circuit having a first input connected to said pulse former output, a second input connected to receive said filtered colour burst and an output connected to the control input of said variable delay device to provide control of the delay period thereof, whereby when a burst transition is detected by said window circuit coincident with a pulse from said pulse former, the control signal from said window circuit effects a change in the delay period of said delay device to cause said trailing edge to occur between burst transitions.

2. An input oscillator according to claim 1, wherein said delay device is a monostable circuit variable by a period substantially equal to half the burst subcarrier period.

3. An input oscillator according to claim 2, wherein said select burst transition device is a bistable circuit set by said trailing edge from said monostable circuit and reset by the next occurring burst transition.

4. An input oscillator according to claim 1, wherein the triggered oscillator circuit is connected to the output of said select burst transition device via a monostable circuit and a bistable, wherein the output of the select burst transition device sets said bistable to one output state which stops the triggered oscillator circuit and simultaneously changes the state of said monostable circuit, said monostable re-setting after a predetermined delay period to cause its output to reset said bistable to start the oscillator circuit.

* * * * *